United States Patent [19]

Tritenne

[11] 4,062,613

[45] Dec. 13, 1977

[54] CONNECTING DEVICE

[76] Inventor: Claude Henri Eugene Tritenne, Les Morenes, Thoiry, Ain, France

[21] Appl. No.: 672,966

[22] Filed: Apr. 2, 1976

[30] Foreign Application Priority Data

May 7, 1975 France .................................. 75.14925

[51] Int. Cl.² .............................................. H01R 11/20
[52] U.S. Cl. ................................... 339/95 B; 339/232
[58] Field of Search ........................... 339/95, 232, 268

[56] References Cited

U.S. PATENT DOCUMENTS

| | | | |
|---|---|---|---|
| 1,675,991 | 7/1928 | Poland | 339/232 |
| 1,720,067 | 7/1929 | Weisgerber | 339/232 |
| 1,854,489 | 4/1932 | Sebell | 339/95 B |
| 2,384,211 | 9/1945 | Sutherland | 339/232 |
| 3,663,927 | 5/1972 | Bruner | 339/232 |

Primary Examiner—Joseph H. McGlynn
Attorney, Agent, or Firm—Browdy and Neimark

[57] ABSTRACT

A battery terminal connecting device comprises a socket which is provided on its external surface with a thread which allows attachment of an outer element provided with a threaded hole which matches the thread of the socket. The socket is provided on its internal face with projecting parts located along at least one circular helix.

9 Claims, 9 Drawing Figures

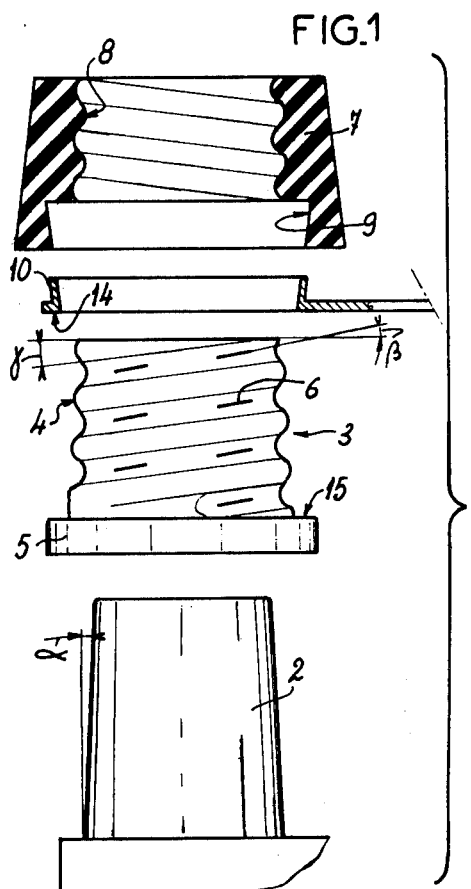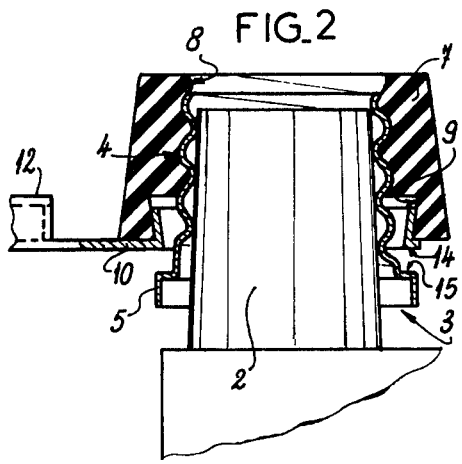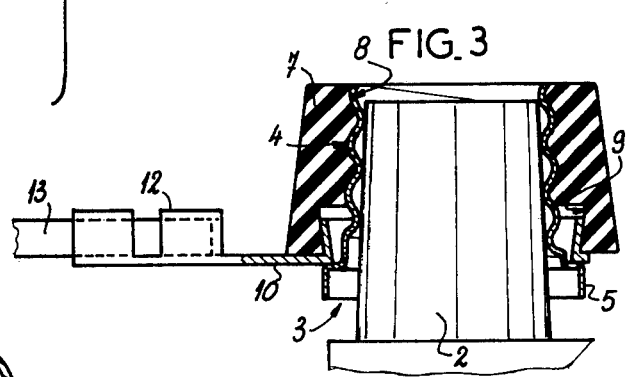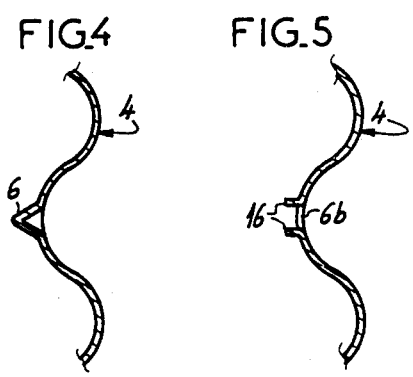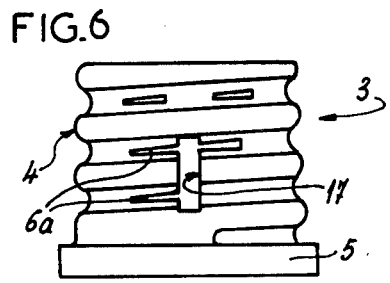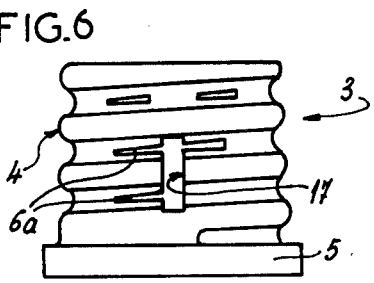

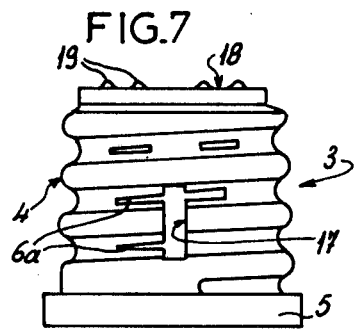
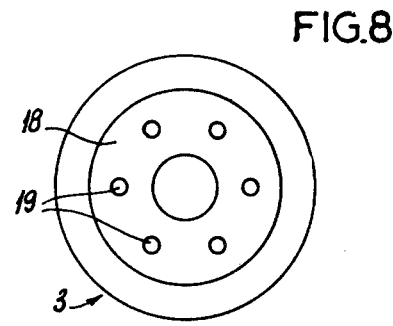
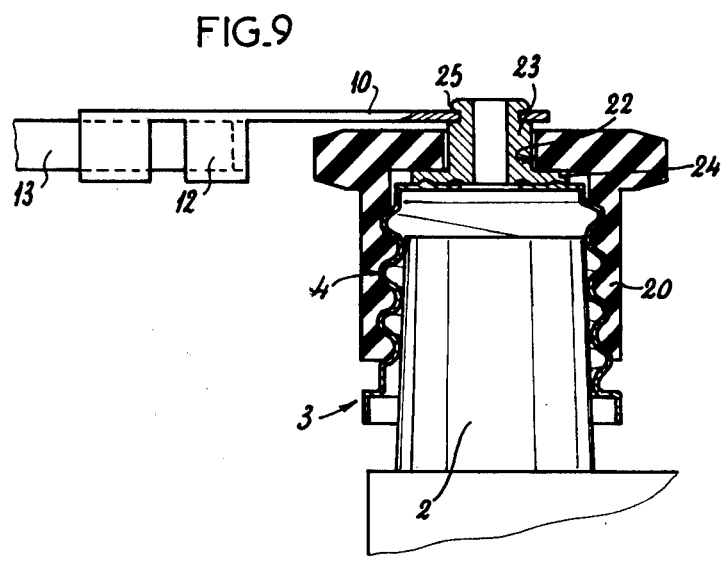

CONNECTING DEVICE

FIELD OF THE INVENTION

The present invention relates to connecting a smooth conical part and a socket with a matching shape, and, more particularly, to a device for making such a connection.

BACKGROUND OF THE INVENTION

There is a need for providing mechanical and electrical junctions between two conductors, such as a connector and a terminal post on a storage battery. Automobile storage batteries are provided with two terminal posts to which connections are most frequently effected by means of ring clamps attached by nut-and-bolt systems.

The principal shortcoming of such devices is that they require the use of tools when it is necessary to change the battery, or more simply, when it is desired to recharge a battery. In the latter case, it is strongly advised that the battery be disconnected from the electrical system of the vehicle by disconnecting at least one of the terminals.

Certain devices which allow disconnecting one of the connectors from its terminal post without using tools do exist. Systems of this kind often use the property possessed by the battery terminals, usually formed of lead, of being malleable, and are therefore capable of undergoing certain deformations of the material. Thus, one of the best known systems comprises a connector having a slotted skirt provided with grips which fasten themselves to the terminal post under the influence of annular tightening accomplished by means of a ring clamp. A nut associated with the skirt and ring allows the connector and terminal post to be brought into contact by screwing.

The principal shortcomings of this device are its cost and use, which are, respectively, high and difficult due to the large number of assembly operations. In addition, the slotted skirt has the disadvantage of rapid deterioration of the terminal posts through penetration of the grips into their material. Consequently, after a certain number of manipulations, the terminal is worn and it is no longer possible to achieve an efficient attachment thereto.

SUMMARY

The present invention is designed to overcome the shortcomings of known devices, such as indicated above; another object is to overcome such prior shortcomings and/or to provide for improved interlocking of conically shaped interfitting elements; a further object is to carry out the above objects by providing a system for mechanical and electrical connection between two conductors, extremely simple to manufacture, with rapid installation and good reliability.

For this purpose, the device of the present invention has a socket which is provided on its external surface with a thread which allows attachment of an outer element provided with a threaded hole which matches the thread of the socket. The socket is provided on its internal face with projecting parts located along at least one circular helix.

When the outer element fitted on the socket has been screwed down all the way onto the socket, and when screwing is continued, the projecting parts provided on the internal surface of the socket tend to penetrate the conically shaped piece, (e.g., a terminal post) over which the socket is placed, ensuring the attachment of the socket to the post in conjunction with the deformation of the socket caused by the stresses produced between the corresponding helixes in the external threads and those corresponding to the projecting parts.

Advantageously, the circular helixes corresponding respectively to the threads on the socket and the projecting parts of the socket twist in the same direction, and the pitch of the helixes corresponding to the projecting parts is greater than the pitch of the threads of the socket. In this way, a gentle screwing of the outer element mounted on the socket causes a relatively significant axial displacement of the socket and consequently causes it to become rapidly locked to the conically shaped post. In cases where the socket has a small thickness, the projecting parts are provided in the bottom of the thread along several circular helixes with the same pitch. The projecting parts may extend through the socket or not.

In a preferred form of the invention, each projecting part on the socket has a pointed shape, with the narrowest part being located forward in the screwing direction. In this way, the penetration of the projecting parts into the conically shaped post is accomplished with relative ease, while the posterior enlarged portion of each projecting part prevents any accidental unscrewing of the socket during unscrewing of the outer element mounted thereon.

In cases where the present device is applied to a mechanical and electrical connection between a terminal post on a storage battery and a connector thereto, the socket being made of a conducting material, the latter is provided at its wider end with a shoulder to hold tight the outer element pressed against it.

The outer element consists of a cap which is made of an insulating material and is provided at its lower part and along its internal surface with a peripheral groove with a truncated conical shape, into which a connector is force-fit, said connector being provided with a central opening with a diameter which is greater than that of the threaded part of the socket and is free to rotate relative to the cap but is integral with the cap translation-wise (i.e., radially), so that the connector can be brought into contact with the shoulder of the socket during tightening.

It is clear that simple tightening of the cap allows the electrical connection between the connector, which is integral with a cable that forms part of the electrical system of the vehicle, and the battery terminal. By unscrewing the cap, the connector is released from the shoulder of the socket which provides an intermediate contact.

BRIEF DESCRIPTION OF THE DRAWING

In any case the invention will be quite clear from the description which follows with reference to the attached schematic drawing which shows as non-limiting examples several embodiments of this device when it is applied to a mechanical and electrical connection between a connector and a battery terminal:

FIG. 1 is an exploded elevation view, partly in section, of the various parts which must be assembled, in a first embodiment of a device of the present invention.

FIGS. 2 and 3 are two cross sections of different parts of FIG. 1, in assembled position, with electrical contact being open and closed, respectively.

FIG. 4 and 5 are two transverse views of two types of sockets at the level of one of their projecting parts on the internal surface thereof.

FIG. 6 is a side elevation of a variation of the socket shown in FIG. 1.

FIG. 7 is a side elevation of a variation of the socket shown in FIG. 6.

FIG. 8 is a top view of the socket in FIG. 7.

FIG. 9 is a cross section of various elements in assembled form, of the socket in FIG. 7, with the electrical contact being in the closed position.

DETAILED DESCRIPTION OF THE EMBODIMENTS

The device shown in the drawing is intended to accomplish mechanical and electrical connection of a connecting wire to a storage battery terminal post 2 made of a soft and malleable material such as laed. As is usual, the terminal post 2 has a slightly conical shape, with its smaller cross section being located at its free end. Each generatrix forms an angle of $\alpha°$ with the axis.

Next the device comprises a metal socket 3 made of steel, brass, or bronze for example, with the same taper as the terminal post 2. On its external surface, the socket 3 is provided with a thread 4 with a half-rounded configuration, such thread 4 terminating at the end of the socket with the larger cross section in a shoulder 5. This thread can be produced by the fluid-die method in view of the preferably small thickness of the walls of the socket.

At the bottom of the thread 4 are provided inwardly projecting parts 6 which may be produced by the fluid-die method or by using shaping wheels or dies, such parts 6 projecting from the internal surface of the socket and being disposed along circular helixes with the same pitch. It should be noted that the pitch of the circular helixes corresponding to projecting parts 6 is preferably greater than the pitch of thread 4. The latter is shown in FIG. 1 by angles $\beta$ and $\gamma$ which correspond, respectively, to the tangents of the lead angles of the helixes of thread 4 and projecting parts 6. For example if angle $\beta$ is 3°, angle $\gamma$ may be about 5°. In the embodiment shown in FIG. 4, projecting parts 6 each consist of an impression which does not run all the way through the thickness of the socket and is provided on the internal surface of the socket as a ridge.

A cap 7 is mounted on the socket 3, such cap being made of an insulating material, and being provided with a thread 8 which matches thread 4 of socket 3. At the lower part of this cap 7 and on its internal surface there is provided a peripheral groove 9 of a truncated conical shape in which an annular circular metal connector 10 is mounted, free to rotate. The diameter of the central opening in this connector 10 is larger than the diameter of the socket 3 in its threaded part at its largest cross section. This connector 10 is provided with means of attachment 12 to a cable 13 such as by crimping.

When the assembly consisting of the cap 7 and the connector 10 is mounted on the socket 3, such socket already having been joined by firm contact to the terminal post 2, as shown in FIG. 2, and when a rotary movement in the tightening direction is given to the cap 7, the lower surface 14 of the connector 10 comes into contact with the upper surface 15 of the shoulder 5 of the socket 3, thus ensuring an electrical connection between the terminal post 2 and the cable 13, as seen in FIG. 3.

When the cap 7 is unscrewed, the connector 10, which is free to rotate relative to the cap 7, but cannot move with respect to it axially or radially, moves out of contact with the shoulder 5 of the socket 3, and is not in contact with the lateral surfaces of the socket either, due to the large diameter of the central opening with which it is provided. The electrical connection is thus broken.

After the cap 7 is screwed down onto the socket 3, the projecting parts 6 of the socket dig into the malleable body of the terminal post 2 of the storage battery. This phenomenon is accompanied by various compressions and extensions of the respective materials involved, due to the internal stresses between the helixes corresponding to the threads and the projecting parts. The combination of these effects results in a locking effect which is predetermined as a function of the needs and deformations produced in order to prevent separation of the socket 3 and the terminal post 2 when the cap 7 is unscrewed.

Advantageously, and as shown in FIG. 6, each projecting part 6a is tapered, with its narrower portion being located forward in the direction of tightening, thus facilitating the digging into the body of the terminal post 2, while the rearmost portion is wider thus resisting any loosening movement, and consequently the disconnection of the socket 3 and the terminal post 2 when cap 7 is loosened is greatly inhibited.

In order to promote locking, each projecting part of the socket 3 may be made as shown in FIG. 5 by a hole 6b such that two lips 16 can dig into the terminal post 2 and undergo deformation in order to accomplish the desired attachment. In order to facilitate attachment, by deformation of the socket 3, the latter may be provided with longitudinal slits 17, as shown in FIG. 6. Thus, in the embodiment shown in FIG. 6, a slit 17 has been provided between two projecting parts 6a.

As can be seen from the above description, the invention provides considerable improvement of existing technology by furnishing a device composed of a small number of parts that are cheaper to manufacture and are very simple to assemnble. Thus, it is possible to have an assembly consisting of cap 7 and connector 10 ready to attach to socket 3 and to effect the assembly by simply fitting the socket onto a terminal post 2, automatically locking the parts in contact with the lead of which the terminal post 2 is made through the initial tightening of the cap 7 with the projecting parts 6 digging into the terminal. Of course, it is necessary to attach the electrical cable 13 to connector 10 in a conventional manner by crimping or automatic soldering or the like.

FIG. 7 shows a variation of the embodiment of the socket shown in FIG. 6, in which the latter is provided at its upper part with a flange 18, provided with studs 19 of an essentially hemispherical shape. A socket of this kind is intended for being used together with a cap 20 which is provided at its upper end with an opening 22 which serves to allow a conducting insert 23 to pass therethrough. The insert 23 is provided with a flange 24 which is in contact with the internal surface of the cap 20 to which is attached, by crimping at 25, the end of the connector 10 for attachment to an electrical cable 13. After the cap 20 is tightened onto socket 3, the insert 23 comes into contact with the upper part of the socket, thus ensuring its electrical connection to the cable 13. The studs 19 aid in the contact and prevent rotation of insert 23 while the cap 20 is tightened. It is obvious that studs 19 could also be made on the surface of the insert 23 which is designed to come in contact with the flange 18 of the socket 3.

Of course, the invention is not limited only to those embodiments of this device which have been described hereinabove in the case of its application to mechanical and electrical junctions between two conductors; on the contrary, it embraces all embodiments. For example, the cap can be made of a conducting material, covered on the part in contact with connector 10 with a lining made of an insulating material, without departing thereby from the scope of the invention.

It will be obvious to those skilled in the art that various changes may be made without departing from the scope of the invention and the invention is not to be considered limited to what is described in the specification.

What is claimed is:

1. Connecting device for a smooth male part of a conical shape made of a soft material, comprising:
    a generally cup-shaped socket made of a harder material than the male part, said socket being provided on its external surface with threads, on its internal surface with projecting parts which are distributed along at least one circular helix, and wherein said socket is provided with a certain number of axial openings which are located between two adjacent projecting parts and facilitate its deformation during tightening, and
    an outer element provided with a threaded hole complementary in shape with the external surface of said socket, whereby said outer element is adapted to screw over said socket overlying the smooth male part and cause said projecting parts to dig into said male part.

2. Device according to claim 1, said socket has a small thickness and the projecting parts are provided in the bottom of the threads along several circular helixes of the same pitch.

3. Device according to claim 1, wherein each projecting part has a pointed shape, with the narrowest part being located forward in the screwing direction.

4. Device according to claim 1, including a plurality of slots in said socket, and wherein the projecting parts are composed of edges of said slots, such that each slot has two edges in contact with the conically shaped part.

5. Device according to claim 1, wherein the circular helixes corresponding respectively to the threads of the socket and said projecting parts run in the same direction, and the pitch of the helixes corresponding to the projecting parts is greater than the pitch of the threads on the socket.

6. A device for connecting an electrical cable to a storage battery terminal having a smooth male part of a conical shape made of a soft material and constituting a battery terminal post, comprising:
    a generally cup-shaped socket made of a harder material than the male part, said socket being provided on its external surface with threads, and on its internal surface with projecting parts which are distributed along at least one circular helix,
    an outer element provided with a threaded hole complementary in shape with the external surface of said socket, whereby said outer element is adapted to screw over said socket overlying the smooth male part and cause said projecting parts to dig into said male part, and
    a connector integral with a cable which is part of the electrical system of a vehicle, said connector being mounted on said outer element whereby it is brought into contact with said socket when said outer element is screwed fully onto said socket.

7. Device according to claim 6, wherein the socket is blocked in its upper part by a flange which is provided with regularly distributed studs of an essentially hemispherical shape, and the outer element fitted against the socket consists of a cap which is made of an insulating material provided at its upper part with an opening to allow the passage therethrough of a said connector made of a conducting material which has a flange intended to come in contact with the internal surface of the cap and to whose other end is attached by crimping the end of a connecting link to an electric cable, the connector thus being free to rotate relative to the socket, but being unable to move axially, so as to be capable of being hrought in contact with the socket when the cap is screwed down.

8. Device according to claim 6, wherein the socket has an end of given size and a wider end, is made of a conducting material, and is provided at said wider end with a shoulder which serves to tighten the outer element pushed against it.

9. Device according to claim 8, wherein the outer element fitted against the socket consists of a cap which is made of an insulating material and is provided at its lower part and on its internal surface with a peripheral groove of a truncated conical shape, into which is force-fitted said connector which is provided with a central opening with a diameter greater than that of the threaded part of the socket and is free to rotate relative to the cap but is unable to move in the axial direction, so as to be capable of being brought in contact with the shoulder of the socket by screwing.

* * * * *